United States Patent
Billeci et al.

(10) Patent No.: US 7,480,833 B2
(45) Date of Patent: Jan. 20, 2009

(54) METHOD AND SYSTEM FOR PERFORMING A HARDWARE TRACE

(75) Inventors: Michael Billeci, Poughkeepsie, NY (US); Timothy J. Slegal, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/779,561

(22) Filed: Jul. 18, 2007

(65) Prior Publication Data

US 2008/0016409 A1    Jan. 17, 2008

Related U.S. Application Data

(63) Continuation of application No. 10/616,635, filed on Jul. 10, 2003, now Pat. No. 7,278,063.

(51) Int. Cl.
*G06F 11/00* (2006.01)
(52) U.S. Cl. .............................. 714/45; 714/34; 714/35; 714/39
(58) Field of Classification Search ................... 714/34, 714/35, 39, 45
See application file for complete search history.

(56) References Cited

U.S. PATENT DOCUMENTS

| 6,243,836 | B1  |   | 6/2001  | Whalen |
| 6,543,002 | B1  |   | 4/2003  | Kahle et al. |
| 6,839,869 | B2  | * | 1/2005  | Doi et al. ....................... 714/45 |
| 6,918,065 | B1  | * | 7/2005  | Edwards et al. ............... 714/45 |
| 6,961,875 | B2  | * | 11/2005 | Floyd et al. .................... 714/45 |
| 6,985,848 | B2  |   | 1/2006  | Swoboda et al. |
| 7,007,205 | B1  | * | 2/2006  | Yeager et al. ................. 714/45 |
| 7,039,834 | B1  |   | 5/2006  | Orfali |
| 7,058,928 | B2  | * | 6/2006  | Wygodny et al. ........... 717/128 |
| 2002/0166083 | A1 | * | 11/2002 | Anderson et al. ............. 714/37 |
| 2002/0178403 | A1 |   | 11/2002 | Floyd et al. |
| 2003/0192034 | A1 |   | 10/2003 | Hayase |

* cited by examiner

*Primary Examiner*—Robert Beausoliel
*Assistant Examiner*—Joseph D Manoskey
(74) *Attorney, Agent, or Firm*—Cantor Colburn LLP; Lynn Augspurger

(57) ABSTRACT

Methods and systems for pre-detecting a hardware hang in a processor. The methods comprise maintaining a count of a number of cycles in a predefined time interval without an instruction being completed; detecting a pre-hang condition if said count is within N counts of a hang limit; initiating trace capture in response to detecting said pre-hang condition; and detecting a hang condition if said count equals said hang limit.

2 Claims, 5 Drawing Sheets

METHOD AND SYSTEM FOR PERFORMING A HARDWARE TRACE

CROSS REFERENCE TO RELATED APPLICATIONS

This application is a continuation of U.S. patent application Ser. No. 10/616,635, filed Jul. 10, 2003, the disclosure of which is incorporated by reference herein in its entirety.

FIELD OF THE INVENTION

This invention relates to computer processor chips. The invention particularly is directed to processors implementing on-chip debug functions, such as hardware trace.

RELATED APPLICATIONS

The present application is related to the co-pending United States patent application "Method and Apparatus for Increasing the Effectiveness of System Debug and Analysis", U.S. Patent Application Publication Number US 2002/0178403 A1, filed by Michael Stephen Floyd, Larry Scott Leitner and Kevin F. Reick.

This co-pending application and the present application are owned by one and the same assignee, International Business Machines Corporation of Armonk, N.Y.

The description set forth in this co-pending application is hereby incorporated into the present application by reference.

BACKGROUND

Existing computer systems use hardware trace arrays. These trace arrays allow development engineers to debug, diagnose, and maintain the computer processor. In general, the trace array captures status information so that the status information may be analyzed. Start and stop conditions may be used to indicate when the hardware trace array is capturing information. Existing techniques, however, do not control starting and stopping the capturing of the status information in a manner that allows all status information for all cycles of interest to be detected.

SUMMARY OF THE INVENTION

A set of embodiments of the invention are directed to methods of pre-detecting a hardware hang in a processor. The methods comprise maintaining a count of a number of cycles in a predefined time interval without an instruction being completed; detecting a pre-hang condition if said count is within N counts of a hang limit; initiating trace capture in response to detecting said pre-hang condition; and detecting a hang condition if said count equals said hang limit. Trace capture is initiated by defining a wrap-back address space and, during a compression mode, storing trace data circularly in the wrap-back address space. Upon exiting the compression mode, a write address is established for further trace data such that trace data prior to exiting compression mode is maintained. Establishing the write address is performed by retrieving a jump-to address outside of the wrap-back address space and writing the further trace data to the jump-to address space.

Another set of embodiments of the invention are directed to systems for pre-detecting a hardware hang in a processor. The systems comprise a hang counter for maintaining a count of a number of cycles in a predefined time interval without an instruction being completed; a pre-hang detector for detecting a pre-hang condition if said hang counter is within N counts of a hang limit; a pre-hang detect latch for initiating trace capture in response to said pre-hang detector detecting a pre-hang condition; and a hang detector for resetting said pre-hang detect latch if said hang counter equals said hang limit. Trace capture is performed using trace arrays that include a wrap-back address space, trace controls that include a trace data write address register containing an address within the trace arrays for trace data, a wrap-back address decrementor, and a jump-to address incrementor. During a compression mode, the trace controls control the address within the write address register by storing an output of the wrap-back address decrementor in the write address register to store trace data circularly in the wrap-back address space. Upon exiting the compression mode, the trace controls establish the address within the write address register for further trace data such that trace data prior to exiting compression mode is maintained. The trace controls receive a jump-to address from the jump-to address incrementor and write the jump-to address to the write address register. The further trace data are written to a jump-to address space.

These and other improvements are set forth in the following detailed description. For a better understanding of the invention with advantages and features, refer to the description and to the drawings.

Figure 1:
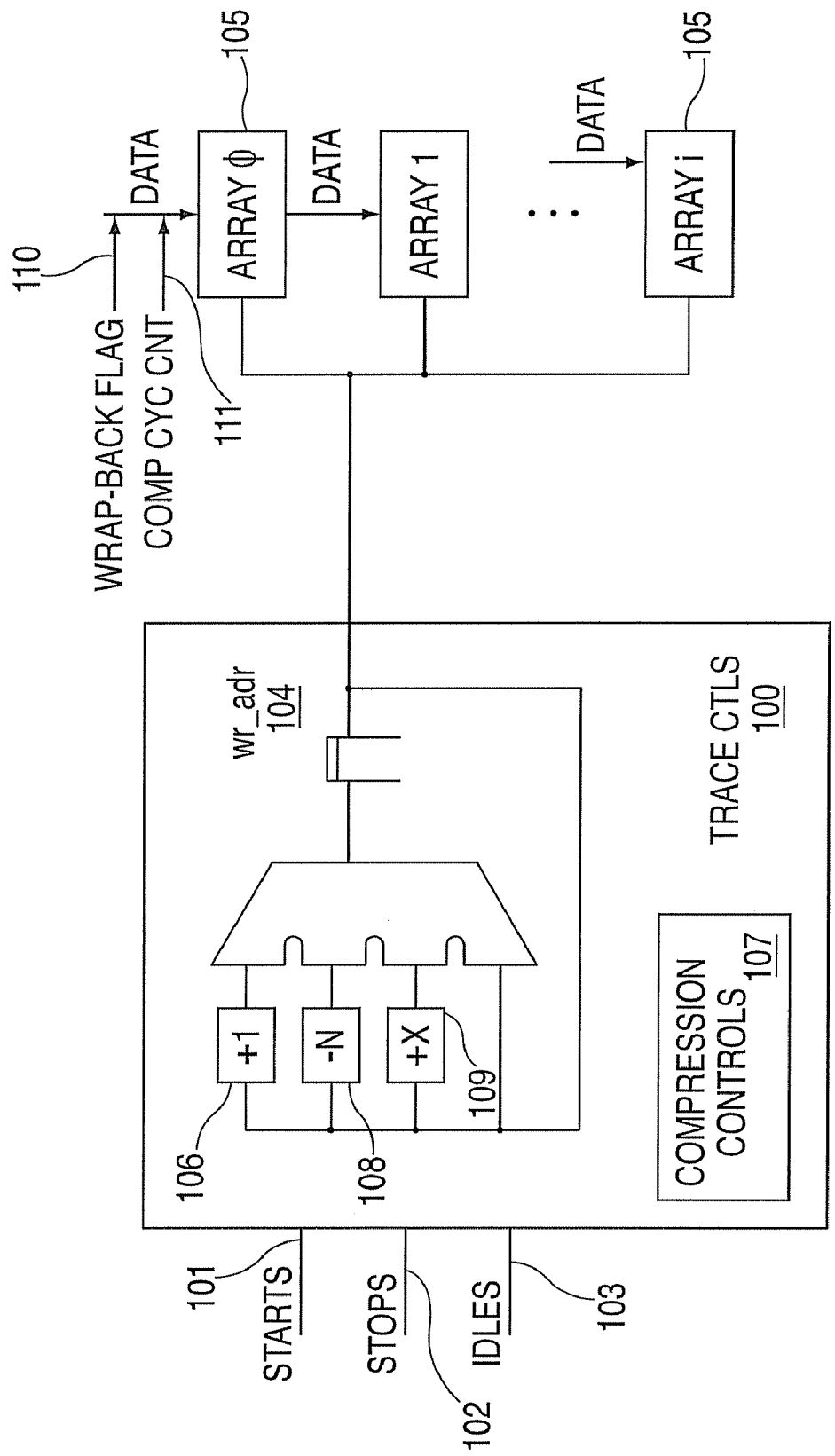
FIG. 1 depicts a processor having trace controls implementing compression wrap-back.

The detailed description explains the preferred embodiments of our invention, together with advantages and features, by way of example with reference to the drawings.

DETAILED DESCRIPTION OF THE INVENTION

Trace arrays provide numerous functions such as capturing results, addresses, instructions and other internal state information to help diagnose design problems with the hardware. Another function is capturing the state leading up to the error to understand its cause when a hardware error occurs. Another function is sampling addresses, instructions and other internal state information to obtain performance characteristics of the system. Another function is capturing branch addresses to help diagnose software problems.

A given trace array might, for example, be 64 bits wide and 256 bits deep. Therefore, on any cycle 64 bits of state information may be captured. Information may then be captured for up to 256 cycles which may be contiguous or noncontiguous. A processor might contain ten or more such trace arrays, giving the ability to capture several hundred total bits of state information every cycle. One typical implementation would capture the inputs on all traces arrays in the same cycle. The address pointer would then step to the next address and capture the inputs in that array address on the next cycle. This stepping of the address and capturing of array inputs would be repeated until the address pointer is at its maximum value, when it would then be set back to the lowest address value. In other words, the trace array is implemented as a circular buffer, in this example with 256 buffer entries and 64 bits in each entry.

There is little value to the above implementation if the traces arrays are written and the address stepped in every cycle; to be useful, there must be a means of starting and stopping the writing to the trace arrays. One implementation, contains a plurality of programmable trace array start and stop conditions. Some examples of these conditions include start on instruction decode, start or stop on program instruction address, start or stop on a particular opcode being decoded or executed, start or stop on program interruption, start or stop on asynchronous interruption, stop on a hardware error or hang being detected. Another condition is stop on a programmable count value. For this condition, after the last start condition has been reached, the trace arrays are stopped after the number of cycles that have been programmed has been reached. The range of programmable values might be from 1 through several thousand.

Many other trace start and stop conditions may be used, based on the individual processor implementation. For example, to debug a problem that is known to be occurring at a computer instruction at a particular instruction address, one could program the trace arrays to start at that instruction address (or slightly before it) and then to run for 256 cycles. This would fill the trace arrays with information about the internal state of the processor when that instruction is being executed.

An implementation of trace arrays may also have at least two modes of operation. The first will be called "normal mode." In this mode, once the trace arrays are stopped due to a stop condition, they are not restarted until some external event restarts them. The external event might be the logging of the contents of the arrays. The second mode will be called "restart mode." In this mode, when a stop condition is detected the traces arrays are stopped; however, if a subsequent start condition is detected then the trace arrays will restart and continue capturing information. The restart mode is particularly useful in observing the last (of several) occurrences of an event. Returning to the prior example, it may be that the problem being diagnosed with the instruction at a particular instruction address does not occur every time that instruction is executed. There may, for example, be other conditions that are not always present that are necessary to make the problem manifest itself. Therefore, by using restart mode of the trace arrays, the last occurrence of the instruction is captured, presumably, the time the problem has actually occurred.

When a processor is no longer under development but has been shipped to customers, typically, the trace arrays would be programmed to be always running to capture the events leading up to a hardware error or to help diagnose errors in Licensed Internal Code (commonly referred to as microcode).

A trace array setup for a customer environment might be the following: stop on hardware error, start on instruction decode, stop on count (typically 30 to 50 cycles), and using restart mode. The purpose of the stop on hardware error is to capture the events leading up to a hardware error or hang condition. Even though the trace arrays are set up in restart mode, an error condition is the only condition that does not automatically restart the traces. The trace arrays would then be typically logged out by microcode running in the system and the data contained in the trace arrays analyzed.

The purpose of the other trace array conditions is less obvious. First, consider the case of a cache miss or other period where there is little activity within the processor. Many cycles of the trace array (or perhaps even the full 256 entries) would be filled with the same values in this case. Informally, this is known as a "flat line" condition. There is no useful debug information contained in these cycles since every cycle in the trace where this flat line condition is present contains the same, or nearly the same, information. Furthermore, since the number of entries is limited (256 in one implementation), potentially useful information is being lost.

A solution to this problem is to stop the trace arrays when no useful events are occurring. A primitive way of doing this is to set the trace array controls to start on decode and stop on a relatively small count (32 cycles in one implementation). Therefore, if an instruction does not decode within 32 cycles, the trace arrays are stopped. But since restart mode is active, the trace arrays are restarted as soon as the next instruction decodes.

Another, somewhat more sophisticated, solution is to use trace compression. In this implementation, there may be several functional units within the processor. For example, an instruction decoder, an instruction execution unit, a data cache, an instruction cache, etc. All (or some) of these units send a signal to a centralized trace control logic that indicates if that unit is idle. That is, it is not doing anything that merits tracing. Then the centralized trace control logic determines if all units are idle, and if so, it stops the trace. The idle cycles are essentially compressed out of the trace arrays since they are not being written. In a typical implementation, it may be programmable to determine if any given unit is enabled for trace compression. Therefore, the engineer debugging a problem can program the centralized trace control logic to ignore monitoring idle signals from a given unit. So in this case, the centralized trace control logic stops the traces only if all units that are enabled for trace compression indicate that they are idle.

While all of the above apparatuses and techniques provide very good debug information, both while a processor is still under development and in a customer's environment, there are still some shortcomings. One problem is that there is typically a latency of a few cycles between when the start or stop condition is detected by the hardware and the time the array is actually able to start or stop. In some cases, this prevents the cycles of interest from being captured in the trace arrays. Another problem is when compression algorithms are not programmable enough, they tend to become less useful. They either compress out too many cycles or not enough. Yet another problem is when the processor hangs due to a deadlock condition or harmonic series of events. With the default trace array setup discussed above, the events initially causing the hang are captured, but since stop on count is triggered after a relatively few cycles, the final sequence of events are not captured (this is particularly important in a harmonic series of events causing a hang).

Embodiments of the invention provide a number of features to improve trace capture. An exemplary embodiment of the invention provides compression wrap-back. This feature addresses the issue of the latency in the trace start/stop controls that can cause the loss of debug data that often occurs in the cycles that lead up to the end of a trace compression window. In existing designs it is not possible to capture these cycles without staging all of the trace signals through several levels of registers, which is a very costly implementation.

A processor having trace controls implementing compression wrap-back is shown in FIG. 1. The trace controls 100 receive control signals for starting trace capture 101, stopping trace capture 102 and compressing trace capture 103. Using these signals and other state information the array write address (wr_adr) register 104 is generated and driven to the trace arrays 105. If the trace is running and not compressed, the write address 104 is incremented each cycle by incrementor 106. Thus, traces are written to the arrays 105 in sequential addresses.

If a compress window is detected by compression controls 107, the trace address will continue to increment until a predesignated wrap-back count is reached, at which time the array address will be wrapped-back by wrap-back address decrementor 108 to the beginning of the wrap-back address space. The wrap-back address space serves as a circular buffer to hold trace data during a compression window.

When compression controls 107 detect the end of the compression window, the array write address is incremented ahead X cycles by jump-to address incrementor 109 to exit the compression wrap-back address space to the next available array address. The net result of this operation is that the arrays will have captured traces for the N cycles (set by address decrementor 108) that lead up to the indication that the compression window is ending. This effectively eliminates latency between detecting end of idle to resuming trace capture. Not only does it eliminate the latency, but it also can show any number of cycles (up to n-latency) that precede the end of the idle window.

The array controls 100 also implement provisions for a compress cycle count of less than the wrap-back count N. That is, if the actual cycles compressed is less than N, then exiting the wrap-back address space through jump-to address incrementor 109 will not be invoked. Instead the address is incremented by one at address incrementer 106 at the end of the compression window.

If the number of cycles traced during a compression window is not evenly divisible by N, the resulting cycles traced during this window will be out of sequence in the wrap-back address space. To manage the back-end formatting, in which these cycles will need to be reordered, a wrap-back flag 110 and a compression cycle count (comp cyc cnt) 111 are captured as part of the trace data. The flag is a single bit register that changes value every N cycles during compression. The counter can be a relatively small counter, such as 8 bit, that increments during a compression window, saturates and holds at its maximum value and resets when the compression window ends. The formatting program detects the wrap-back window by a non-zero value in the compression cycle counter. It detects out of sequence entries by a change in value of the wrap-back flag across contiguous entries that have a non-zero compression count.

Figure 2:
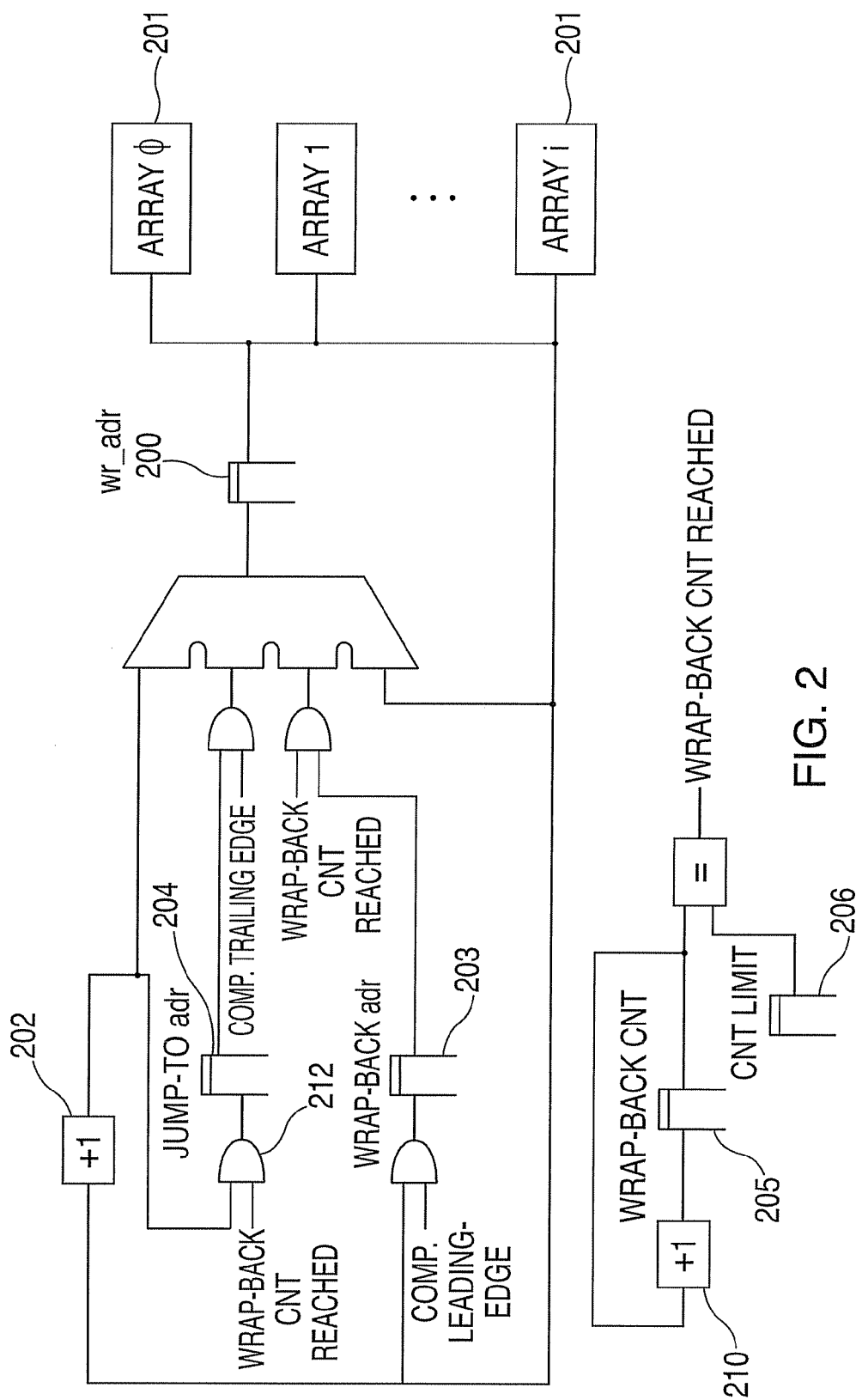
FIG. 2 depicts an exemplary embodiment of processor implementing compression wrap-back.

FIG. 2 depicts one embodiment of processor logic providing the compression wrap-back feature. As described above, this implementation maintains a write address register 200 that controls where data is saved in the trace arrays 201. When the trace is running, the next write address is derived from the address incrementer 202, the wrap-back address register 203 or the jump-to address register 204.

When no compression window is present, traces are stored in trace arrays 201 based on addresses provided by address incrementor 202. Upon detection of a leading edge of a compression window, the signal comp_leading_edge is high causing the write address register 200 to load a wrap-back address from wrap-back register 203. This wrap-back address is then incremented by address incrementor 202 until a wrap-back count is reached. A wrap-back count register 205 is incremented by incrementor 210 each cycle. When the wrap-back count exceeds a count limit in count limit register 206, a wrap-back count reached signal is generated. This causes the wrap-back address in wrap-back register 203 to again be loaded to write address 200.

When the end of the compression window is detected, a jump-to address is determined. The jump-to address ensures that the new traces are not written over traces in the wrap-back address space. If the wrap-back count reached signal is active, this indicates that the wrap-back address space has been filled at least once. Thus, a jump-to address is needed to exit the wrap-back address space. As shown in FIG. 2, a jump-to address register 204 is selected upon the wrap-back count reached signal activating gate 212. Once the trailing edge of the compression window is detected as indicated by signal comp_trailing_edge, the jump-to address is read from jump-to address register 204. If the wrap-back count has not reached the count limit, then there is no need to completely exit the wrap-back address space. If wrap-back count reached signal is not active, the jump-to address is not read from jump-to address register 204. Rather, the next address is determined by incrementing the current write address at incrementor 202.

Another feature of the invention is a programmable compression function for collecting trace data. Having the correct amount of compression is needed to capture useful trace data. Too much compression and the cycles of interest will not be captured. Too little compression and the cycles of interest will be overwritten in the arrays. The compression routine in an embodiment of the invention is preferred over a loss-less algorithm in which selected bits of trace input data is compared against previous cycles and not captured if identical, because this implementation uses much less core real estate, thereby leaving room for adding more arrays and collecting more data.

Figure 3:
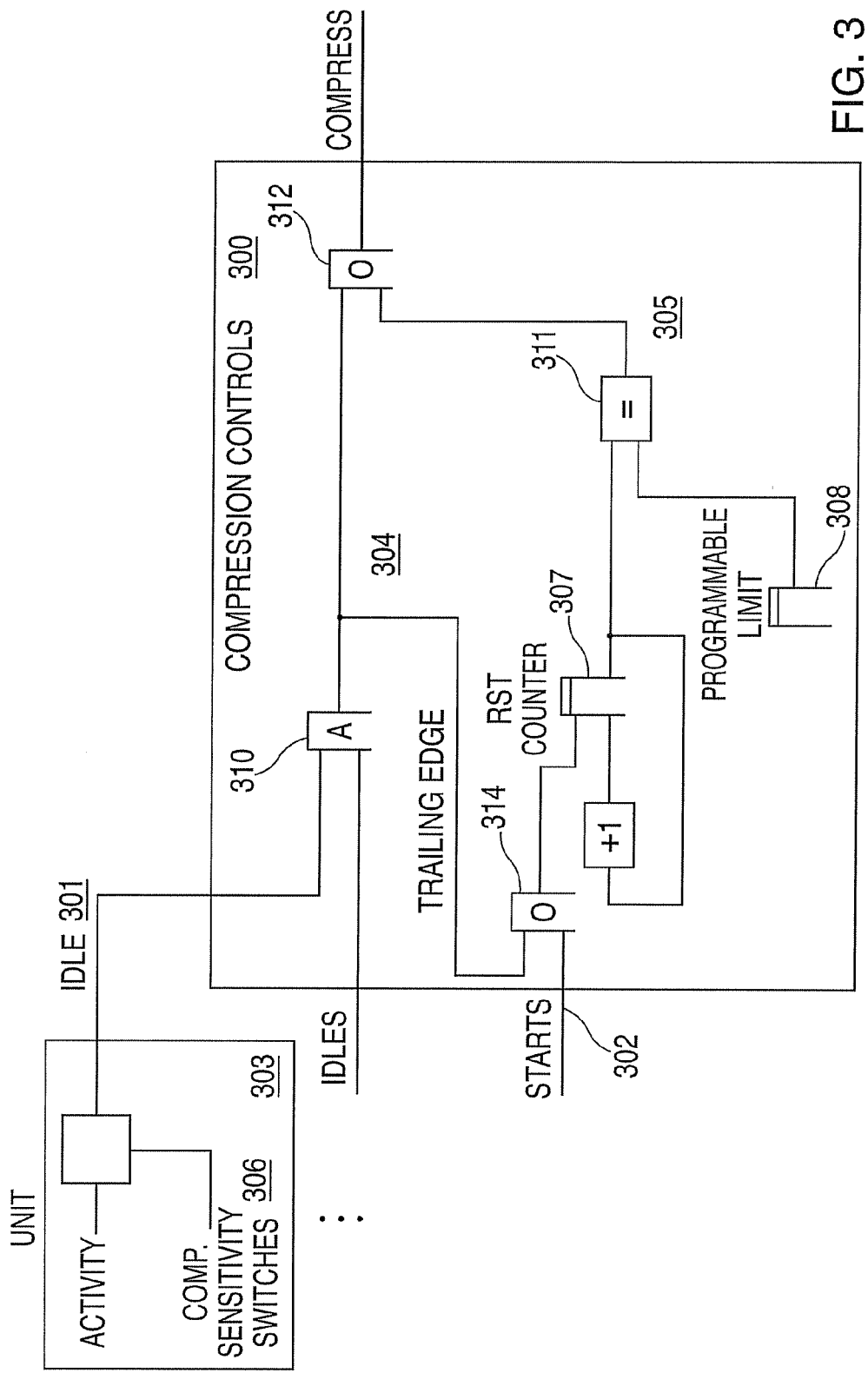
FIG. 3 depicts exemplary programmable compression controls and compress due to count logic.

FIG. 3 depicts programmable compression controls in an embodiment of the invention that initiates compression due to a count. The central trace controls contain a compression function 300 that receives idle signals 301 and start signals 302 from one or more units 303. Two mechanisms are used to initiate compression. First, if each unit indicates an idle state through idle signals 301, gate 310 generates an inactivity signal 304 that causes gate 312 to issue a compression signal. Each of the units 303 includes user-controlled compression sensitivity switches 306.

The sensitivity switches 306 may be scan-only registers that are used to select what type of activity unit 303 should factor into the idle indication 301. As an example, an instruction unit 303 may factor the following two conditions into its idle decision: instruction decode successful and valid instruction text in the instruction buffers. By degating these conditions with sensitivity switches 306 from the decision, unit 303 will greatly alter what activity is considered idle. At one extreme, unit 303 will only consider itself idle when there is no decode successful AND there is no valid i-text in the instruction buffers. At the other extreme, unit 303 will consider itself idle independent of these conditions. By careful application of these switches, the user can program the level of compression due to idle to suit the current debug needs.

Alternatively, if a counter 307 reaches a programmable limit in programmable limit register 308, the comparator 311 issues a count signal 305 to gate 312 which then issues the compression signal. The gate 312 generates the compression signal in response to either inactivity signal 304 or count signal 305. The counter 307 is reset by gate 314, ending the compression window, on any start signal 302 from any unit 303 or a trailing edge of the inactivity signal 304 indicating that at least one unit is active.

Another feature of the invention addresses the problem of not capturing useful trace information in the case of a hardware hang. When the programmable limit 308 and sensitivity switches in each unit 303 are correctly set, the trace should be in a compressed window for the time interval leading up to a hardware hang. But for effective debug, the trace must wake up and trace the final cycles leading up to the hang.

An embodiment of the invention provides a restart condition referred to as start on hardware hang. Detection logic predicts the hardware hang by n cycles and causes a start. This has the effect of 'waking up' the trace (by either starting a trace or ending a compression window of an already running trace). This captures the last n cycles of the trace that lead up to the hang.

Figure 4:
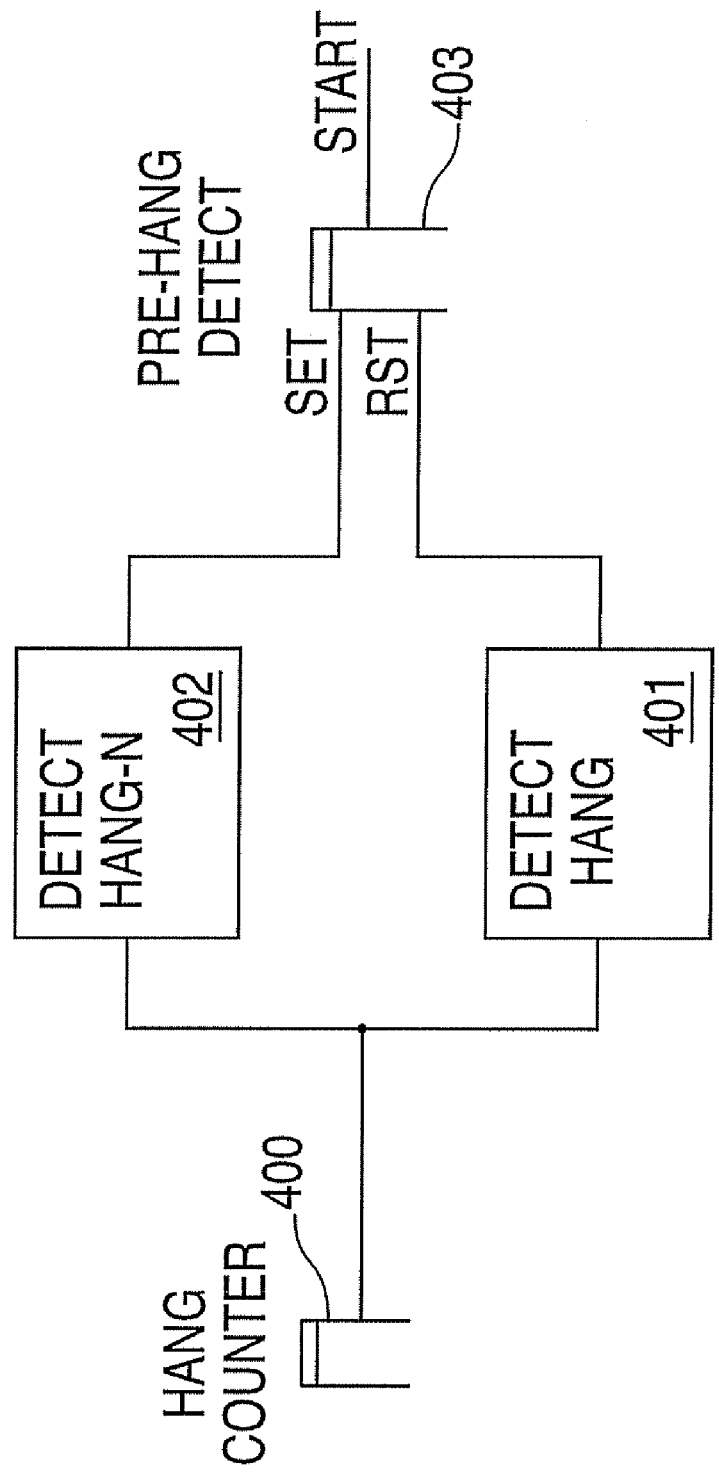
FIG. 4 depicts logic for capturing a trace upon a hardware hang.

FIG. 4 depicts logic to capture the cycles that lead up to a hardware hang. A hang counter 400 counts the number of cycles in a predefined time interval, for example 1 ms. Hang counter 400 resets every time an instruction completes. If the hang counter 400 is not reset in the time interval, it reaches a hang limit and a hang is detected by hang detector 401. When a hang is detected, hardware recovery is invoked. As part of recovery, the trace arrays will be logged by millicode.

To get useful trace data for the trace, the hang is pre-detected by n cycles by pre-hang detector 402. In other words, if the hang counter 400 is within N counts of the hang limit, the pre-hang detector 402 detects a pre-hang state. This sets the pre-hang detect latch 403 that holds a set state until the hang occurs and is detected by hang detector 401. The hang detector resets pre-hang detect latch 403. While set, the pre-hang detect latch 403 generates a start signal for each cycle, thereby forcing trace to run for that time interval.

Figure 5:
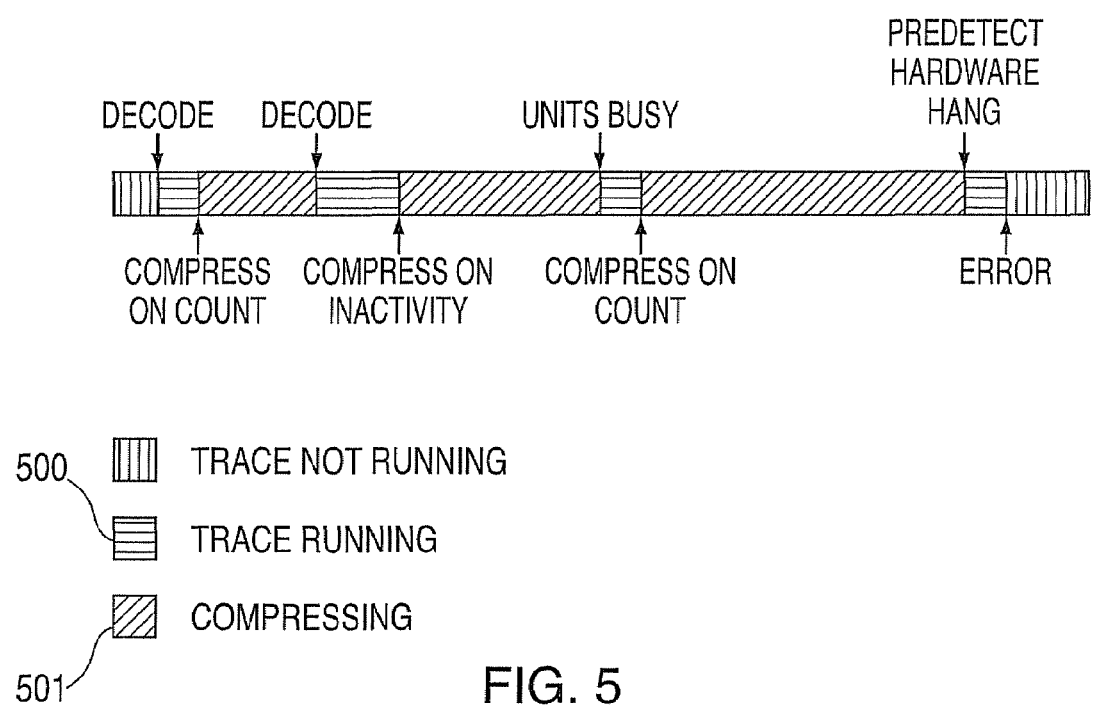
FIG. 5 depicts a default trace setup.

The features of the invention provide trace improvements as depicted in FIG. 5 which illustrates various modes for a default trace setup. The default trace initiates the following actions: start on decode, compress on count, compress on inactivity from a mixture of selected units, compression wrap-back enabled, start on hardware hang, stop on error and normal mode. As shown in FIG. 5, the tracing can be limited to the cycles of interest 500 with the less useful cycles 501 compressed out.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of pre-detecting a hardware hang in a processor, the method comprising:

maintaining a count of a number of cycles in a predefined time interval without an instruction being completed;

detecting a pre-hang condition if said count is within N counts of a hang limit;

initiating a trace capture in response to detecting said pre-hang condition by defining a wrap-back address space such that, during a compression mode, trace data is stored circularly in the wrap-back address space and, upon exiting the compression mode, a write address is established for further trace data such that trace data prior to exiting compression mode is maintained, wherein the write address is established by retrieving a jump-to address outside of the wrap-back address space and writing the further trace data to the jump-to address space, wherein the compression mode utilizes a respective plurality of functional units in the processor, each of the respective plurality of functional units sending a corresponding signal to a centralized trace control logic indicative of whether or not a functional unit of the respective plurality of functional units is idle, and if the centralized trace control logic determines that all of the respective plurality of functional units are idle, then the centralized trace control logic stops the trace; and detecting a hang condition if said count equals said hang limit.

2. A system for pre-detecting a hardware hang in a processor, the system comprising:

a hang counter for maintaining a count of a number of cycles in a predefined time interval without an instruction being completed;

a pre-hang detector for detecting a pre-hang condition if said hang counter is within N counts of a hang limit;

a pre-hang detect latch for initiating trace capture in response to said pre-hang detector detecting a pre-hang condition;

one or more trace arrays operatively coupled to the pre-hang detect latch for performing the trace capture, the one or more trace arrays including a wrap-back address space;

a centralized trace control operatively coupled to the one or more trace arrays, the trace control including a trace data write address register containing an address within the one or more trace arrays for storing trace data;

a wrap-back address decrementor and a jump-to address incrementor wherein, during a compression mode, the trace control controls the address within the write address register by storing an output of the wrap-back address decrementor in the write address register to store trace data circularly in the wrap-back address space; wherein, upon exiting the compression mode, the trace control establishes the address within the write address register for further trace data such that trace data prior to exiting compression mode is maintained; wherein the compression mode utilizes a respective plurality of functional units in the processor, each of the respective plurality of functional units sending a corresponding signal to the trace control indicative of whether or not a functional unit of the respective plurality of functional units is idle, and if the trace control determines that all of the respective plurality of functional units are idle, then the trace control stops the trace;

wherein the trace control receives a jump-to address from the jump-to address incrementor and writes the jump-to address to the write address register; and wherein the further trace data are written to a jump-to address space; and a hang detector for resetting said pre-hang detect latch if said hang counter equals said hang limit.

* * * * *